United States Patent
Gates et al.

(10) Patent No.: US 6,737,107 B2
(45) Date of Patent: May 18, 2004

(54) NONOPARTICLES FORMED WITH RIGID CONNECTOR COMPOUNDS

(75) Inventors: Stephen McConnell Gates, Ossining, NY (US); Christopher Bruce Murray, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/408,570

(22) Filed: Apr. 7, 2003

(65) Prior Publication Data

US 2003/0170386 A1 Sep. 11, 2003

Related U.S. Application Data

(62) Division of application No. 09/361,396, filed on Jul. 26, 1999, now Pat. No. 6,440,560, and a division of application No. 10/056,531, filed on Jan. 24, 2002, now Pat. No. 6,599,623.

(51) Int. Cl.⁷ .............................. B05D 7/00; B05D 7/24
(52) U.S. Cl. ........................ 427/212; 427/214; 427/215; 427/220; 427/384; 427/387
(58) Field of Search ................................. 427/212, 214, 427/215, 220, 384, 387

(56) References Cited

U.S. PATENT DOCUMENTS

| 4,988,514 | A |   | 1/1991  | Fukuyama et al. | 428/447  |
|-----------|---|---|---------|-----------------|----------|
| 5,324,370 | A |   | 6/1994  | Aoki et al.     | 156/64   |
| 5,336,786 | A |   | 8/1994  | Shiobara et al. | 549/215  |
| 5,371,161 | A |   | 12/1994 | Knott           | 528/9    |
| 5,683,501 | A |   | 11/1997 | Tomihisa et al. | 106/491  |
| 5,801,092 | A | * | 9/1998  | Ayers           | 438/623  |
| 6,107,184 | A |   | 8/2000  | Mandal et al.   | 438/623  |
| 6,143,643 | A |   | 11/2000 | Carter et al.   | 438/622  |
| 6,147,009 | A |   | 11/2000 | Grill et al.    | 438/780  |
| 6,162,743 | A |   | 12/2000 | Chu et al.      | 438/781  |
| 6,352,775 | B1 |  | 3/2002  | Sasaki et al.   | 428/403  |
| 6,514,481 | B1 |  | 2/2003  | Prasad et al.   | 424/9.32 |

OTHER PUBLICATIONS

Laura Peters (Senior Editor). "Pursuing the Perfect Low–K Dielectric". Semiconductor International, Sep. 1998, pp. 64–74.

\* cited by examiner

*Primary Examiner*—Elena Tsoy
(74) *Attorney, Agent, or Firm*—Ohlandt, Greeley, Ruggiero & Perle, L.L.P.; Wan Yee Cheung

(57) ABSTRACT

The present invention relates to a novel organosilicon particle having the formula $Si_aO_bC_cH_d$. The particle may be coated with an organic film, preferably a rigid connector compound. The present invention also provides a method of using the organosilicon particle and/or rigid connector compound in the formation of a low-k dielectric film.

7 Claims, No Drawings

NONOPARTICLES FORMED WITH RIGID CONNECTOR COMPOUNDS

This is a division of application Ser. No. 09/361,396 filed on Jul. 26, 1999 (now U.S. Pat. No. 6,440,560 issued Aug. 27, 2002), and Ser. No. 10/056,531 filed on Jan. 24, 2002 now U.S. Pat. No. 6,599,623 issued Jul. 29, 2003.

FIELD OF THE INVENTION

This invention relates to the field of interconnect wiring of high-speed integrated circuit chips. More particularly, it relates to the formation of low dielectric constant films through the use of nanoparticles formed with rigid connector compounds.

BACKGROUND OF THE INVENTION

In order to increase the speed of microelectronic integrated circuits, both the size of the wiring features and the spacing between adjacent wires must be reduced. One critical area in need of advancement in order to simultaneously reduce the size and spacing of the wiring features, and maintain a high speed of signal propagation is the dielectric material used between the metal interconnects of the integrated circuit. For example, for a given film wire resistance R, the speed of the interconnect signal varies as 1/RC, where C is the capacitance between wires. Using a low dielectric constant film (low-k dielectric) makes C smaller and hence increases the speed of the circuit. Films with dielectric constants in the range of 2–3 will be needed within 2 years for future high-speed integrated circuits.

In addition, as distances between circuit elements become smaller, there are increased problems due to capacitive coupling and induced propagation delays. One way to reduce these difficulties is through the use of low-k dielectrics. Low-k dielectrics lower line capacitance of the interconnects.

U.S. Pat. No. 5,801,092 to Ayers describes a method of forming a dielectric film utilizing silicon dioxide nanospheres. A non-polar organic coating surrounds the silicon dioxide nanospheres. Ayers utilizes these organic coated nanospheres to form a porous dielectric film. The more porous the film, the lower its dielectric constant. The silicon dioxide particles are made by the hydrolysis and condensation reactions of tetraethylorthosilicate, (TEOS), as the precursor molecule. The non-polar organic film used in Ayers consists of fluoroalkylsilane compounds. The fluoroalkylsilane compounds only bind to the nanoparticle at one end and are very flexible.

One problem with the nanosphere particles in Ayers is that the core dielectric material is made up of silicon dioxide, which has a relatively high dielectric constant of about 4. The silicon dioxide core material limits the reduction of the dielectric constant of the porous film. Another problem in Ayers is that the organic film is flexible and binds the nanospheres at only one site. When a dielectric film is formed by these organic coated nanospheres, the flexible organic compounds compress and the spaces between the nanospheres are reduced. The film structure formed is only slightly porous resulting in a higher dielectric constant film. In addition, since the organic films are flexible, variability of compression can change the porosity of the film, resulting in a non-reproducible dielectric constant film.

It is thus an object of the present invention to provide a nanometer scale particle that has a lower dielectric constant than silicon dioxide and can be used in the formation of a low-k dielectric film.

It is another object of the present invention to provide a rigid connector compound between particles that resists compression, resulting in a more reproducible, porous and lower dielectric constant film.

It is also an object of the present invention to provide a fabrication method using the novel dielectric particle and/or rigid connector compounds to form a low-k dielectric film.

SUMMARY OF THE INVENTION

The present invention relates to a novel organosilicon particle having the formula $Si_aO_bC_cH_d$. The particle may be coated with an organic film, preferably a rigid connector compound. The present invention also provides a method of using the organosilicon particle and/or rigid connector compound in the formation of a low-k dielectric film.

DETAILED DESCRIPTION OF THE INVENTION

The present invention relates to an organosilicon particle having the formula $Si_aO_bC_cH_d$. The mole fraction of a is about 0.05 to 0.5, preferably about 0.1 to 0.4, and more preferably about 0.15 to 0.25. The mole fraction of b is about 0.05 to 0.5, preferably about 0.1 to 0.4, and more preferably about 0.2 to 0.35. The mole fraction of c is about 0.05 to 0.5, preferably about 0.10 to 0.5, and more preferably about 0.15 to 0.4. The mole fraction of d is about 0 to 0.5, preferably about 0.05 to 0.4, and more preferably about 0.1 to 0.4.

The particle preferably is produced on a nanometer scale, e.g., 2 to 100 nm, preferably 5 to 50 nm, using thermal decomposition of organosiloxane, organosilane, siloxane, silane or halosilane precursor molecules.

The advantage that the particle of the present invention has over prior art dielectric particles is that it is an organosilicon particle. This carbon-containing particle has a lower dielectric constant, (k of approximately 2.5 to 3.5), than silicon oxide particles of the prior art.

The particle is preferably coated with an organic compound. A preferred organic compound should (1) render the particle hydrophobic to resist moisture, (2) contain a hydrolyzable site capable of bonding to the particle (3) lower the overall dielectric constant of the particle and (4) render the particle soluble in a non-polar solvent. Examples of such preferred organic compounds are alkylsilane or alkylsilylhalide compounds such as $X_3SiR$ where X is about a $C_1$ to $C_4$ alkoxy or a halogen and R is about a $C_8$ to $C_{30}$ alkyl.

A more preferred organic compound is one that is a rigid connector compound. A rigid connector compound is one that is not flexible, resists compression and will not bend back against itself. Preferred examples of such rigid connector compounds are compounds having the formula $(R^1)_3Si$—$(Ar)_n$—$Si(R^1)_3$, wherein $R^1$ is about a $C_1$ to $C_4$ alkoxy or a halogen, Ar is an aromatic or substituted aromatic and n is about 1 to 6. Preferred aromatic compounds are phenyl or substituted phenyl, naphthyl or substituted naphthyl and anthracenyl or substituted anthracenyl. The aromatic compounds are preferably substituted with fluorine. An especially preferred rigid connector compound is bis (trimethoxysilyl) polyphenylene.

Another example of a preferred rigid connector compound is a compound having the formula $(R^2)_3Si$—$(bco)_n$—$Si(R^2)_3$, wherein $R^2$ is about a $C_1$ to $C_4$ alkoxy or a halogen, bco is an bi-cyclo-octane or substituted bi-cyclo-octane and n is about 1 to 6. The bi-cyclo-octane compound is preferably substituted with fluorine. Especially preferred bi-cyclo-octane compounds are 2,4-bi-cyclo-octane and perfluro-poly-2,4-bi-cyclo-octane.

It should be noted that the rigid connector compounds may contain more than 2 hydrolyzable sites capable of being bound to the particle.

The advantage of the rigid connector compounds are that they are rigid and have at least two sites that are capable of attaching to two different particles. The rigid connector compounds prevent compression and preserve the spacing between particles when the particles are used to produce a dielectric film. This results in a more reproducible and porous dielectric film.

The aromatic or bi-cyclo-octane compounds of the present invention are planar compounds that have little or no bond rotation. Thus, they are rigid compounds that do not bend back against themselves. These rigid compounds prevent the binding sites from attaching to the same particle, preserving spacing between the particles.

In an another embodiment, the rigid connector compounds of the present invention are attached to a core material to form a nanoparticle. The core material is preferably a dielectric material. Any suitable dielectric material may be used such as silicon dioxide, silicon nitride, silicon oxyfluoride, organosilicon, oxidized organosilicon, and hydrogenated oxidized organosilicon. The preferred dielectric material is the aforementioned organsilicon particle having the formula $Si_aO_bC_cH_d$.

In another embodiment, the nanoparticles of the present invention are used to form a porous body. The process for forming such a porous body comprises the steps of providing a plurality of core particles, coating the particle with an organic compound, placing the organic coated particle in a solvent, placing rigid connector compounds into the solvent to displace a portion of said organic compound, and removing said solvent to form the porous body. Preferably, the porous body is a low-k dielectric film. A more detailed description of this process is described below.

The core particle material is made with a thermolytic synthesis method. The synthesis method begins with preheating a high-boiling point solvent to a temperature of about 200 to 400° C. Any suitable inert high boiling-point solvent may be used. Preferred solvents are aromatic ethers and substituted aromatic ethers, high boiling point unsaturated hydrocarbons (for example, squalene, or 2, 6, 10, 19, 23-hexamethyltetracosene) and perfluoroalkenes, e.g., perfluorokerosene. The latter have the preferred formula $R^7$—ph—O—ph—$R^8$, where ph is phenyl, and $R^7$ and $R^8$ may be the same or different and selected from phenyl and about a $C_1$ to $C_6$ alkyl. The preferred solvent in phenyl ether at a temperature of about 250° C. Preferably, a stabilizing ligand, discussed below, is also placed in the solvent.

Organosiloxane, organosilane, siloxane, silane and/or halosilane precursor compounds are placed in a syringe and rapidly injected into the preheated solvent. Rapid thermal decomposition of the precursor compound results and nucleation of small amorphous silicon-containing particles occur. The particles are allowed to grow by continued heating of the solution for about 30 minutes. The size of particle at that time is approximately 5 nm. Shorter or longer heating times may be used for smaller or larger particle sizes respectively.

Preferred halosilane precursor compounds have the formula $R^4SiY_3$ where $R^4$ is about a $C_1$ to $C_8$ alkyl and Y is a halogen, preferably chlorine.

A preferred siloxane compound that may be used in the present invention is hydro-silsesquioxane. It has the general formula $H_nSi_nO_{3/2n}$ where n is about 1 to 10.

In a preferred embodiment, the precursor compounds are organosiloxane precursor compounds. In the present invention, organosiloxane compounds are straight, branched or cyclic compounds that comprise at least silicon, oxygen and carbon. Preferred organosiloxane compounds are silsesquioxanes and cyclo-siloxanes.

Examples of silsesquioxanes are incompletely condensed and fully condensed silsesquioxanes. Incompletely condensed silsesquioxanes have the general formula $(R^5SiO_{3/4})_n(H_2O)_{3n/2}$ where $R^5$ is about a $C_1$ to $C_8$ alkyl and n is about 1 to 10. Incompletely condensed silsesquioxanes are formed when compounds of the formula $R^5Si(OH)_3$ are heated and water is removed.

Fully condensed silsesquioxanes are made by removing water from the partially condensed silsesquioxanes. They have the general formula $(R^5SiO_{3/2})_n$. Commercially available examples of fully condensed silsesquioxanes that may be used in the present invention are when n is 6, 8 and 10.

Cyclo-siloxanes may also be used as precursor compounds of the present invention. The preferred cyclo-siloxanes have the general formula $R^6_nH_n(SiO)_n$ and $R^6_{2n}(SiO)_n$ where $R^6$ is about a $C_1$ to $C_8$ alkyl and n is about 1 to 10.

Another preferred organosiloxane has the general formula $CH_3O(SiO(CH_3O)_2)_n OCH_3$ where n is about 1 to 10.

Examples of especially preferred organosiloxane and organosilane compounds are tetraethylorthosilicate, (TEOS), tetramethylsilane (TMS), tetramethylcyclotetrasiloxane (TMCTS), tetraethylcyclotetrasiloxane, (TECTS), cyclotetrasiloxane, cyclopentasiloxane, pentamethylpentasiloxane and mixtures thereof.

These compounds are used to prepare the preferred organosilicon particles of the present invention. For example, a mixture of TEOS:TMS:TMCTS in a ratio of 1:3:2 will result in an amorphous particle containing Si:O:C in a ratio of about 1:1:2.3. Particles with higher or lower carbon content may be prepared by varying the ratio and carbon content of precursor compounds. For example, TECTS may be used instead of TMCTS in the above mixture to increase the carbon content of the resulting particle.

After the particles are grown to their desired size, the reaction is cooled to a convenient low temperature so that the particles stop growing. The temperature should be less than about 150° C., preferably less than 100° C., and more preferably about 60° C. A stabilizing ligand is then added. The stabilizing ligand is an organic compound that coats the particles. Preferably, the stabilizing ligand has the formula $X_3SiR$ where X is about a $C_1$ to $C_4$ alkoxy or a halogen and R is about a $C_8$ to $C_{30}$ alkyl. Preferably, R is about a $C_{12}$ to $C_{24}$ alkyl and more preferably a $C_{16}$ to $C_{20}$ alkyl. When the stabilizing ligands are added, they bind to the particle surface. Optionally, the particles are annealed by raising the solution temperature to 300 to 350° C. for a desired time.

The organic-coated particles may now be precipitated using a polar solvent such as ethanol. Optionally, the particles may be isolated and purified by size selective precipitation to yield a nearly mono-disperse fraction of particles.

A first method of size selective precipitation involves the gradual addition of a polar solvent. A selective amount of polar solvent is added to the organic coated particle mixture. In this process, the largest size organic coated particles are precipitated first and can be isolated by centrifugation or filtration. Subsequent addition of the polar solvent to the organic-coated particle mixture will precipitate particles of slightly smaller sizes. This process can be continued to prepare a distribution of particles sizes. To achieve a nearly mono-disperse particle size, any of the isolated fractions can be re-dispersed in a non polar solvent and subjected to more cycles of size selective precipitation to achieve an arbitrary, narrow, nearly mono-disperse size distribution.

A second method of size selective precipitation consists of dissolving the particle in a mixture of two solvents: one more volatile and non-polar (i.e., pentane) and one less volatile and polar. Slow evaporation of the solvent mixture reduces the amount of the more volatile non-polar solvent resulting in the precipitation of the largest size organic coated particle. Precipitation of slightly smaller particles can be performed in stages by further evaporation to achieve a distribution of particle sizes. The above process may be repeated to achieve a nearly mono-disperse particle size distribution.

The size selective particles are then re-dispersed in a non-polar solvent at a temperature of about 60° C. The rigid connector compound of the present invention is then added to the solution. The solution is stirred and the rigid connector compounds replace some of the organic stabilizer ligands that are bound to the particles. This step is called ligand exchange. After stirring for about 30 minutes, the organic stabilizer ligands and rigid connector compounds reach equilibrium concentration on the surface of the particles. As discussed above, the rigid connector compounds contain at least two sites that are capable of binding on the particles. Their rigidity does not allow them to bend so that two sites will not bind to one particle.

The amount of rigid connector compounds attached to the particles may be increased by re-dispersing the organically coated particles in a non-polar solvent and repeating the ligand exchange step.

It should be noted that in a preferred embodiment, the length of the organic stabilizer ligand is longer than the rigid connector compound. This prevents the rigid connector compound from binding or cross-linking with two particles at this step of the process. If the particles become cross-linked, gel particles or precipitates form such that the particles can not be readily coated on a substrate.

The organically coated particles are then coated on a substrate by any suitable method such as spin coating, dip coating, doctor blading, or spray coating. The thickness of the coating will typically range from about 0.1 to 2 um, preferably about 0.1 to 1 um.

The organically coated particles are then cross-linked such that the rigid connector compounds are attached to at least two particles. To perform the cross-linking, the substrate containing the organically coated particles is placed in an oven, preferably a vacuum oven. The substrate is heated to a temperature of about 250° C. to 300° C. At this temperature, the organic stabilizer ligands are removed by desorption and/or decomposition from the particles and are removed along with the solvent. The unattached sites of the rigid connector compounds now attach to a neighboring particle and cross-links are formed. The substrate is then heated to a higher temperature of about 300° C. to 350° C., which removes any rigid connector compounds that are not cross-linked to two particles. The substrate now contains a porous body or film that is suitable to be used as a dielectric film.

Optionally, the porous body may be coated with a hydrophobic compound such as hexaphenyldisilane or hexamethyldisilazane (HMDS) to maintain moisture resistance. In this step, the substrate is placed in a vacuum oven at about 150° C. The oven is evacuated, and the sample is left at 150° C. for about 10 minutes, The oven is then filled with a vapor of hexamethyldisilazane or hexaphenyldisilazane entrained in an inert gas (nitrogen or argon) with the substrate remaining at 150° C. temperature. After about 20 minutes, the oven is cooled to room temperature and evacuated, and is then held for about 10 minutes. This procedure coats the interior pores with a water repellent (hydrophobic) coating, so the porous body will not absorb moisture and is rendered inert. The oven is then filled with a pure inert gas, and the substrate is removed.

It should be noted that the foregoing description is only illustrative of the invention. Various alternatives and modifications can be devised by those skilled in the art without departing from the present invention.

What is claimed is:

1. A process for forming a porous body comprising the steps of:
    (a) providing a plurality of core particles;
    (b) coating said particles with an organic compound;
    (c) placing said organic coated particles in a solvent;
    (d) placing a rigid connector compound into said solvent to displace a portion of said organic compound; and
    (e) removing said solvent to form said porous body.

2. The process of claim 1 wherein said rigid connector compound has the formula $(R^1)_3Si\text{---}(Ar)_n\text{---}Si(R^1)_3$, wherein $R^1$ is about a $C_1$ to $C_4$ alkoxy or a halogen, Ar is an aromatic or substituted aromatic and n is about 1 to 6.

3. The process of claim 1 wherein said rigid connector compound has the formula $(R^2)_3Si\text{---}(bco)_n\text{---}Si(R^2)_3$, wherein $R^2$ is about a $C_1$ to $C_4$ alkoxy or a halogen, bco is an bi-cyclo-octane or substituted bi-cyclo-octane and n is about 1 to 6.

4. The process of claim 1 wherein said core material has the formula $Si_aO_bC_cH_d$, wherein the mole fraction of a is about 0.05 to 0.5, the mole fraction of b is about 0.05 to 0.5, the mole fraction of c is about 0.05 to 0.5 and the mole fraction of d is about 0 to 0.5.

5. The process of claim 1 wherein said rigid connector compound contains fluorine.

6. The process of claim 1 wherein said porous body is further coated with a hydrophobic compound.

7. The process of claim 1 wherein the length of said organic compound is longer than said rigid connector compound.

* * * * *